Patented June 21, 1938

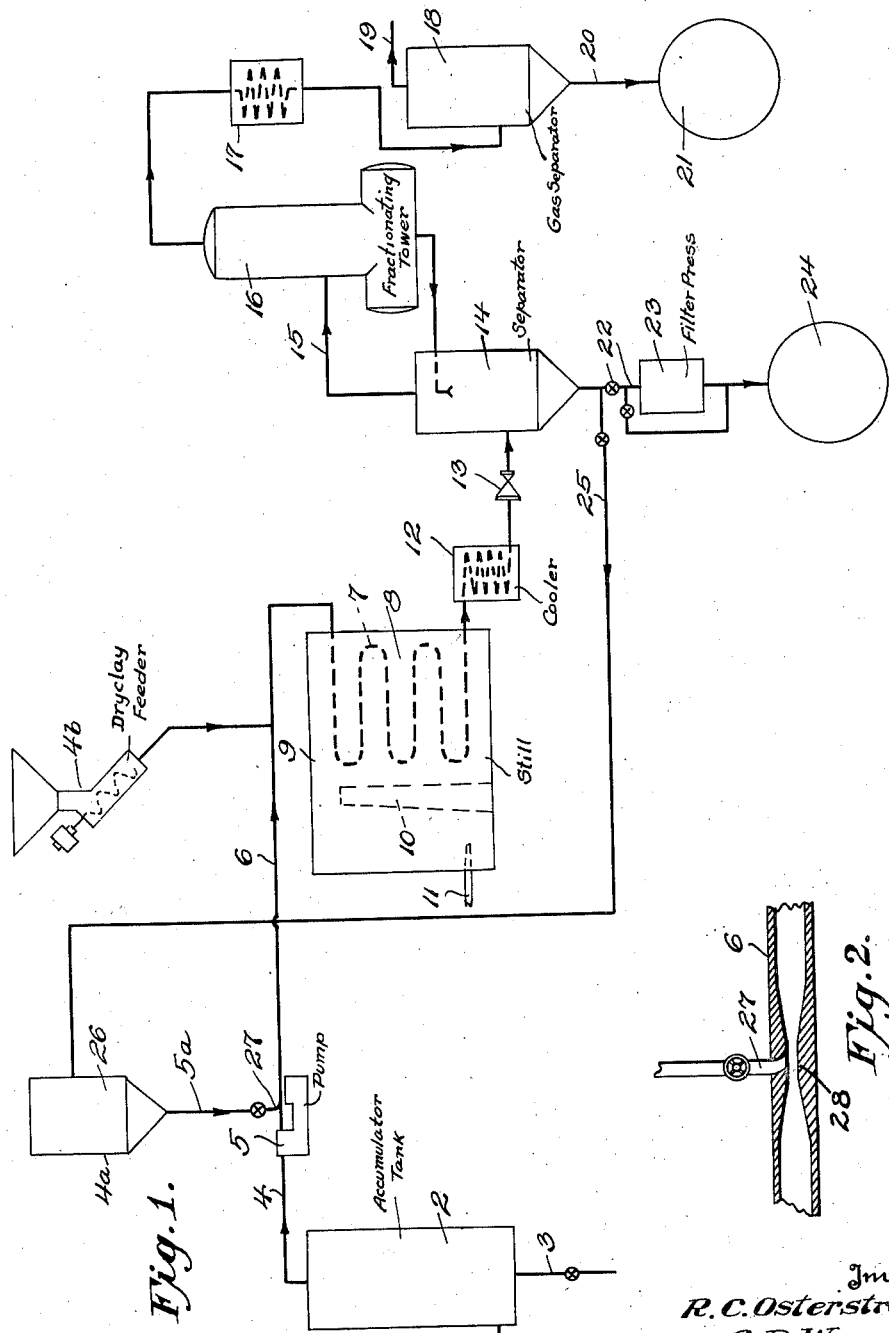

2,121,258

UNITED STATES PATENT OFFICE 2,121,258

POLYMERIZATION OF HYDROCARBON GASES

Rudolph C. Osterstrom and Cary R. Wagner, Chicago, Ill., assignors to The Pure Oil Company, Chicago, Ill., a corporation of Ohio Application December 14, 1929, Serial No. 414,198

9 Claims. (Cl. 196—9).

This invention relates to the art of polymerizing olefin-containing hydrocarbon gases. and is particularly directed to the recovery or formation of hydrocarbons having substantially the boiling range of gasoline or motor fuels from the so-called "fixed gases" produced by the operation of pyrolytic hydrocarbon cracking systems.

In certain types of hydrocarbon cracking systems, particularly those wherein the oil undergoing decomposition is maintained in the vapor phase and wherein high cracking temperatures are utilized, relatively large quantities of gas are produced which unless advantageously employed are apt to render the cracking system uneconomical to operate in comparison with other less desirable methods of cracking wherein smaller quantities of fixed gas are produced. It is customary in the operation of most cracking plants to subject the incondensibles to the action of a compressor for the purpose of recovering the liquid content present in the gases. However, even after this operation there remains a large quantity of gas for subsequent disposal. In many instances this disposal is relatively wasteful in that it is employed merely as burner fuel or where conditions permit it may be employed as an enriching gas for artificially produced heating and illuminating gases since its B. t. u. value is very high.

It is, therefore, an object of the present invention to provide an improved system to effect polymerization of a large proportion of the gases discharged from the compressor liquid recovery system of a cracking plant in order that by subjecting such gases to regulated conditions of temperature and pressure in the presence of a catalyst heavier compounds may be synthetically produced from said gases and which at ordinary conditions of temperature and pressure may be recovered as liquids suitable for use as motor fuels of superior quality.

The invention has for another object to provide for the rapid operation by continuously passing the gases through a pipe still wherein the coils thereof serve as a heated polymerization zone, permitting further or continuous operation as contrasted with the intermittent or batch operation.

It is another object of the invention to provide for the cyclic circulation of the catalyst through the polymerization zone of the process, to the end that the quantity of catalyst employed in the system may be kept constant and at the same time expensive replacement costs of the catalyst reduced to a minimum.

For a further disclosure of the invention and an understanding of the details thereof reference may be had to the following description and the accompanying drawing, wherein Figure 1 is a diagrammatic view illustrating the apparatus used in carrying the present invention into operation, the figure serving also as a flow sheet; Figure 2 is an enlarged view of the aspirator or nozzle for introducing the catalyst into the gas undergoing treatment.

In the drawing, the numeral 1 designates a pipe line which leads from a compressor recovery plant of an oil cracking system or other source of supply. As previously indicated, cracking systems, particularly the so-called "vapor phase" systems, produce relatively large quantities of gas which contain valuable liquid products. This gas is therefore sent to the recovery plant where it is passed through the compressor for the purpose of separating the liquid constituents contained therein from the lighter or gaseous products. The present invention involves the further treatment of the gases released from such recovery plants with the end in view of effecting polymerization of a large proportion of said gases and the production of compounds or liquids therefrom which are suitable for use as motor fuels. It will be understood, however, that the present invention may be operated in connection with gases obtained from other sources than cracking plants, and we contemplate the application of the invention for all such additional uses.

The line 1 leads preferably to an accumulator tank 2 which has a liquid draw-off line 3 in the bottom thereof. From the top of the tank 2 a pipe line 4 leads to a compressor 5. A pipe line 5a extends from the outlet side of the compressor to a catalyst feeding unit 4a, by which regulated quantities of a catalyst or treating agent, preferably fuller's earth or its equivalent, in a finely divided state may be introduced into the gases discharged from the compressor for polymerization promoting purposes. As will be hereinafter described, the introduction of the catalyst or treating agent may be accomplished while the same is either in a dry or fluid state.

The intermingled gas and catalyst are forced through a bank of tubes 7 comprising a polymerization zone. These tubes are located in the tube compartment 8 of a furnace setting 9. The interior of the setting is provided with a bridge wall 10 and on one side of this wall there is arranged burner mechanism 11 by which the interior of the setting is brought to the required temperatures. Within the polymerization zone the gases may be heated to a temperature from 300° F. up to not appreciably in excess of 1000° F. and subjected to super-atmospheric pressures in excess of 300 pounds per square inch. Pressures up to 200 atmospheres may be used. The gases remain in the polymerization zone for a sufficient period of time to permit the desired reactions to take place whereby higher boiling compounds are produced from compounds of lower boiling points, the polymerization reactions being facilitated by the use of the catalyst which moves in stream through the polymerization zone with the gases and fluids under treatment.

When discharged from the polymerization zone 7 the flow stream passes through a cooler 12 to reduce its temperature sufficiently to admit of efficient fractionation. On the discharge side of the cooler 12 a pressure reduction valve 13 is provided so that the fluids leaving the cooler 12 and passing into a separator 14 may be reduced to atmospheric pressure or pressures slightly thereabove. Within the separator 14 there takes place a separation of the heavier compounds, such as polymers and gums and fuller's earth from the lighter vaporous constituents. These lighter vaporous constituents pass overhead from the separator 14 through a pipe line 15 to a fractionating tower 16 where the vapors are subjected to a standard fractionating operation. The vapors released from the top of the fractionating tower pass through a condenser 17 and thence to an oil and gas separator 18, the permanent or fixed gas remaining being released from the separator 18 by way of an outlet 19 while the liquid hydrocarbons which are produced as a result of the polymerization step in the tube bank 7, are removed from said separator by way of an outlet line 20 and led to a storage tank 21. The liquid condensate which collects in the bottom of the fractionating tower 16 may be returned to the top of the separator and employed to scrub the vapors passing upwardly therethrough.

The bottom of the separator 14 is provided with a liquid and clay outlet line 22 which may lead to a filter press 23 by which the liquid oils are separated from the clay treating material, such liquids being finally collected in a tank 24 while the fuller's earth is removed from the filter press in the form of a cake.

An outstanding feature of the present invention resides in the provision of a catalyst return line 25 by which the clay and liquid body which accumulates in the bottom of the separator 14 may be returned to the feeding tank 26 of the unit 4a. The bottom of the tank 26 is provided with a valve controlled outlet 27 which leads into an aspirator 28 forming a part of the pipe line 6. The movement of the gases discharged from the compressor 5 sets up a suction or partial vacuum in the line 27 by which the oil-clay mixture is drawn into the line 6 and there intermingled with the gas stream. The line 6 may also be provided with a feeding unit 4b by which dry clay or fuller's earth may be mechanically introduced into the system as required. This arrangement provides for a ring-like circulation of the catalyst, and/or the heavy liquid oils formed in the separator 14, with the result that the catalyst or the clay treating agent may be employed repeatedly in facilitating polymerization reactions in the zone 7. Heretofore the fuller's earth has been permitted to pass through the system or polymerization zone but once, after which it has been burned or otherwise treated to restore its catalytic activity before being re-introduced into the system. We have found, however, that the liquids present in the bottom of the separator 14 apparently act as solvents in the matter of removing adsorbed matter from the surfaces of the fuller's earth particles, thus permitting of the immediate reuse of the catalyst in the polymerization zone without additional treatment. This step greatly reduces the cost of operating the system, particularly in the matter of catalyst replacement and further admits of the polymerization of low value gas in an economical manner to produce more valuable and desirable end products.

We have used the term "catalyst" in referring to the employment of fuller's earth or its equivalent in the present system. However, this term is used merely for convenience in description since fuller's earth in systems of this character is often referred to not only as a catalyst but as an adsorbent, contact substance or a treating material. Therefore, where the term "catalyst" appears we use the same as referring to fuller's earth and/or its equivalent which may include a wide variety of substances, such as various types of chars, silica gel, diatomaceous earths and the like.

What is claimed is:

1. The method of polymerizing substantially liquid free olefin containing hydrocarbon gases obtained from oil cracking systems, which comprises continuously passing a stream of such gases commingled with a catalyst through an elongated polymerization zone of restricted cross-sectional area, wherein said gases are maintained under super-atmospheric pressures and heated to polymerization temperatures in excess of 300° F. and not substantially in excess of 1000° F., reducing the pressure on the products discharged from said polymerization zone to separate the heavy and light constituents, and returning a portion of the heavy constituents to the inlet side of said polymerization zone for reuse in said zone.

2. The method of polymerizing olefin containing hydrocarbon gases, which comprises continuously passing a stream of such gases through an elongated polymerizing zone of restricted cross-sectional area, maintaining said gases during their travel through said zone under super-atmospheric pressures and temperatures in excess of 300° F. but not appreciably above 1000° F., reducing the pressure on the products discharged from said zone to separate heavy liquid polymers from the lighter and more volatile polymers, and mixing with said gases prior to polymerization said heavier polymers, said heavier polymers being substantially the only liquid hydrocarbons mixed with said gases.

3. In the polymerizing of olefin containing hydrocarbon gases, the method which consists in continuously passing a stream of hydrocarbon gases and fuller's earth through an elongated polymerizing zone of restricted cross-sectional area, heating the gases during their passage through said zone to a temperature of from about 300° F. to about 1000° F. while said gases are maintained under super-atmospheric pressures, reducing the pressure on the products discharged from said polymerizing zone, continuously separating the lighter volatile products from the heavy liquid fraction containing fuller's earth, and continuously returning said heavy liquid fraction and fuller's earth to the inlet side of said polymerizing zone.

4. In the polymerizing of olefin containing hydrocarbon gases, the steps which comprise passing a continuously moving stream of hydrocarbon gases through an elongated polymerizing zone of restricted cross-sectional area while said gases are in the presence of a catalyst, maintaining said gases during their passage through said zone under super-atmospheric pressures and at a temperature of from about 300° F. to about 1000° F., reducing the pressure on the products discharged from said polymerization zone, continuously separating from said products the lighter and heavier fractions thereof, and returning a portion at least of said heavier fraction to the inlet side of the polymerizing zone for repeated recirculation therethrough.

5. The method of polymerizing substantially liquid-free olefin containing hydrocarbon gases produced by the cracking of hydrocarbon oils, which comprises continuously passing a stream of such gases intimately commingled with fuller's earth through an elongated zone of restricted cross sectional area, heating the mixture of fuller's earth and gases during its passage through said zone while the mixture is maintained under superatmospheric pressures to a temperature of between 500° F. to 1000° F., maintaining the mixture in said zone for a sufficient period of time to polymerize a substantial portion of such gases into compounds liquid at normal temperatures and pressures, passing the products discharged from the polymerizing zone under reduced pressures into a separating zone, removing as vapors from said separating zone desired lighter oil compounds, removing at another point from the separating zone the fuller's earth, and accompanying heavy oil, and returning a portion, at least, of the mixture of fuller's earth and heavy oil to the polymerizing zone for passage through said zone together with the fresh gases.

6. The method of polymerizing substantially liquid-free olefin containing hydrocarbon gases produced by the cracking of hydrocarbon oils to form normally liquid oils, which comprises continuously passing a stream composed of such gases commingled with a comminuted solid catalyst through an elongated polymerization zone having a restricted cross sectional area, heating the mixture of catalyst and gases during its passage through said zone, while the mixture is maintained under superatmospheric pressures to a temperature of between 500° F. to 1000° F., maintaining the mixture in said zone for a sufficient period of time to polymerize a substantial proportion of the total quantity of such gases into compounds liquid at normal temperatures and pressures, passing the products discharged from the polymerizing zone under reduced pressures into a separating zone whereby to separate the vapors and gases from the catalyst and accompanying heavy oils, fractionating, condensing and separating the vapors and gases released from one point of the separating zone, removing at another point from the separating zone the catalyst and accompanying heavy oils, and returning a portion, at least, of the catalyst to the polymerizing zone for repassage through said zone with fresh gases.

7. The method of polymerizing fixed olefin containing hydrocarbon gases produced by the cracking of oils to form oils liquid at normal temperatures, which consists in continuously passing a stream of such gases intimately commingled with a solid finely divided catalyst through an elongated zone of restricted cross sectional area, heating the mixture comprising the catalyst and gases during its passage through said zone while the same is maintained under superatmospheric pressures to a temperature of between 500° F. to 1000° F., maintaining the mixture in said zone for a sufficient period of time under such temperature and pressure conditions to polymerize a substantial proportion of such gases into compounds liquid at normal atmospheric temperatures and pressures, passing the products discharged from the polymerizing zone into a separating zone maintained under pressures lower than those in the polymerizing zone, fractionating, condensing and separating the vapors and gases released from the separating zone, returning high boiling compounds condensed by the fractionating step to the separating zone to scrub vapors passing through the separating zone, removing from the bottom of the separating zone the catalyst together with heavy oils which do not vaporize in response to the temperatures of the separating zone, and returning a portion at least of the catalyst and such heavy oils to the inlet side of the polymerizing zone for admixture with fresh gases to be passed through the polymerizing zone.

8. The method of polymerizing olefin containing hydrocarbon gases set forth in claim 7, in connection with the step of reducing the temperature of the heated mixture discharged from the polymerizing zone prior to the delivery of said mixture to the separating zone.

9. The method of polymerizing olefin-containing hydrocarbon gases which comprises continuously passing a stream of such gases through a polymerizing zone wherein the gases are maintained under superatmospheric pressure and at a temperature in excess of 300° F. but not appreciably above 1000° F. for a period of time sufficient to convert a substantial portion of said gases to liquid hydrocarbons, reducing the pressure on the products discharged from said zone, separating the heavier liquid polymers from the lighter and more volatile polymers, and mixing with said gases prior to polymerization said heavier polymers, said heavier polymers being substantially the only liquid hydrocarbons mixed with said gases.

RUDOLPH C. OSTERSTROM.
CARY R. WAGNER.